United States Patent
Relyea

(10) Patent No.: US 8,605,742 B2
(45) Date of Patent: Dec. 10, 2013

(54) WIRELESS CONNECTION UTILIZATION

(75) Inventor: Donald H. Relyea, Dallas, TX (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 673 days.

(21) Appl. No.: 12/619,334

(22) Filed: Nov. 16, 2009

(65) Prior Publication Data

US 2011/0116444 A1  May 19, 2011

(51) Int. Cl.
*G01R 31/08* (2006.01)
*H04B 7/005* (2006.01)
*H04B 1/44* (2006.01)
*G06F 15/173* (2006.01)

(52) U.S. Cl.
USPC ........... 370/437; 370/230; 370/248; 370/252; 370/278; 370/282; 709/226

(58) Field of Classification Search
USPC ......... 370/230, 248, 252, 254, 278, 282, 328, 370/329, 338, 352, 401, 437; 709/225, 226, 709/233
See application file for complete search history.

(56) References Cited

U.S. PATENT DOCUMENTS

| | | | | |
|---|---|---|---|---|
| 6,907,252 | B2 * | 6/2005 | Papadias et al. | 455/456.1 |
| 6,982,544 | B2 * | 1/2006 | Tran | 320/132 |
| 8,149,746 | B2 * | 4/2012 | Demirhan et al. | 370/311 |
| 2006/0172769 | A1 * | 8/2006 | Oh | 455/557 |
| 2006/0174127 | A1 * | 8/2006 | Kalavade et al. | 713/176 |
| 2007/0115950 | A1 * | 5/2007 | Karaoguz et al. | 370/356 |
| 2008/0085723 | A1 * | 4/2008 | Tsao et al. | 455/452.2 |
| 2008/0259841 | A1 * | 10/2008 | Deshpande | 370/328 |
| 2009/0180430 | A1 * | 7/2009 | Fadell | 370/329 |
| 2010/0290424 | A1 * | 11/2010 | Collingrige | 370/329 |
| 2010/0293277 | A1 * | 11/2010 | Rooks et al. | 709/226 |
| 2010/0296437 | A1 * | 11/2010 | Stelle et al. | 370/328 |

* cited by examiner

*Primary Examiner* — Redentor Pasia

(57) ABSTRACT

An exemplary system includes a service provider configured to provide a network service to a local device via a network, and a plurality of mobile devices, where each mobile device is configured to establish a wireless connection with the network. Such an exemplary system also includes a router in selective communication with the local device and the plurality of mobile devices. The router may be configured to establish a local connection with each of the plurality of mobile devices, and receive a request for a network service from the local device. In addition, the router may be configured to provide the requested network service to the local device via the wireless connection.

23 Claims, 3 Drawing Sheets

WIRELESS CONNECTION UTILIZATION

BACKGROUND

Many network services and applications require a high-speed, low-latency connection (e.g., data, video, and voice). In addition, there is often a desire to access such network services in many diverse physical locations. However, some locations may not be equipped for such access. For example, some locations may not include any dedicated wired or wireless broadband access. In addition, it may be logistically inconvenient or expensive to connect certain locations to a broadband network using wires or cables (e.g., using coaxial or fiber-optic cables). Further, there may be a desire to access such network services in a temporary or remote location, such as away from a home or office.

DETAILED DESCRIPTION

Figure 1:
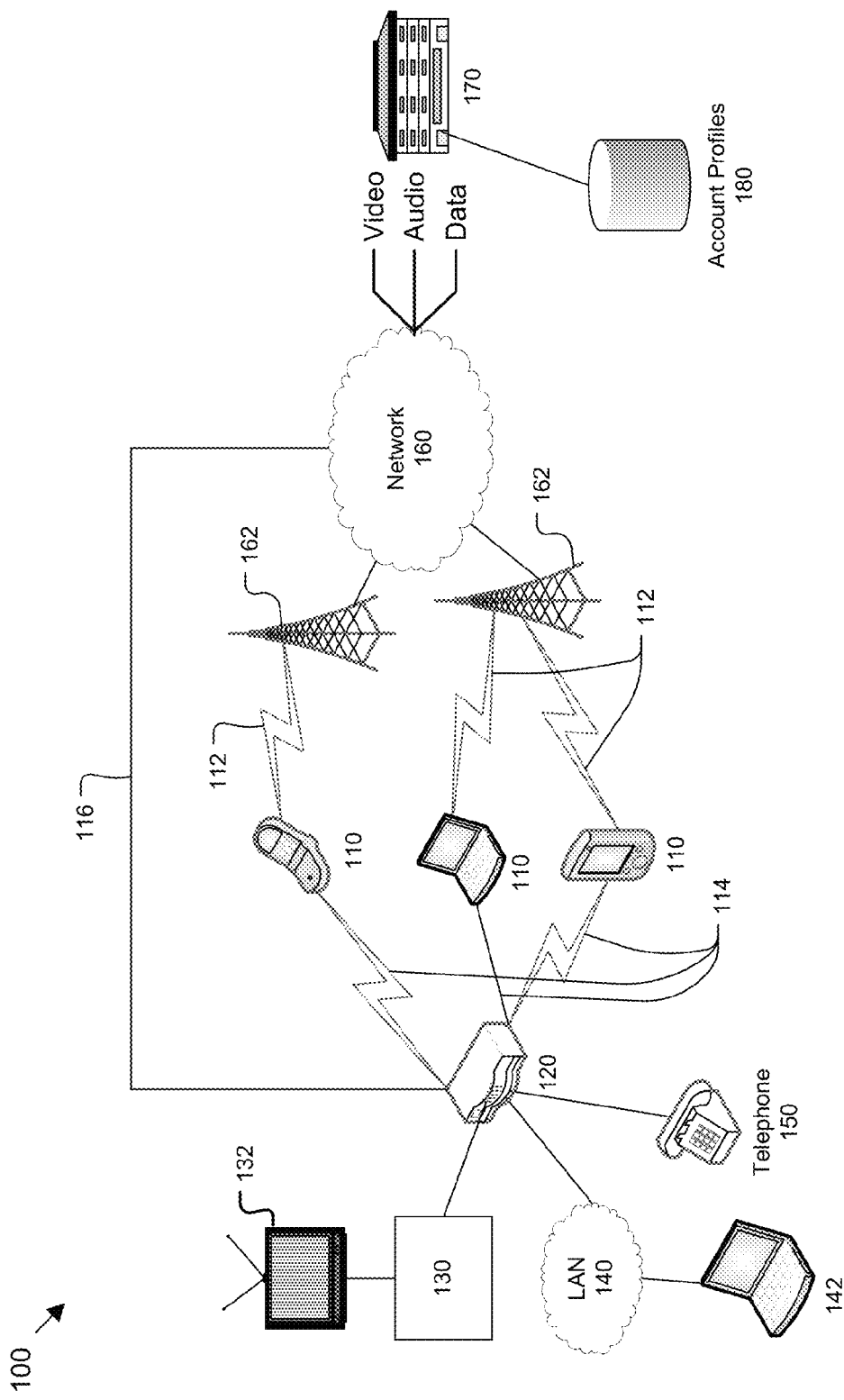
FIG. 1 illustrates an exemplary communication system for providing various network services.

FIG. 1 illustrates an exemplary system 100 for providing a plurality of network services, e.g., voice-over-IP (VOIP), video, data, and other potentially high-bandwidth network services. System 100 may provide such services over a plurality of wireless connections using a plurality of mobile devices 110. For example, system 100 may aggregate a plurality of wireless connections into one or more logical high-bandwidth connections to provide such network services. Further, system 100 may manage such wireless connections to provide bandwidth on-demand, such as by adding, dropping, and aggregating connections based on requests from various devices or systems. In addition, system 100 may enable a mobile device 110 to reserve or allocate bandwidth based on various factors, including user input. For example, bandwidth on a mobile device 110 may be reserved to enable telephone calls while system 100 uses a data connection to provide network services.

As illustrated in FIG. 1, system 100 includes a plurality of mobile devices 110 where each is configured to establish a wireless connection 112 to a network 160. A router 120 may be configured to communicate with mobile devices 110 over local connections 114 and manage the various wireless connections 112 to provide network services to various devices and systems. For example, router 120 may be connected to various devices that utilize such network services, such as a content processing device 130, a local area network (LAN) 140, or a telephone 150. In one example, such network services are provided by a service provider 170, which is also connected to network 160. While an exemplary system 100 is shown in FIG. 1, the exemplary components illustrated in FIG. 1 are not intended to be limiting. Indeed, additional or alternative components and/or implementations may be used, as discussed in greater detail below.

Mobile device 110 is typically any device capable of facilitating data communications between router 120 and network 160, generally by establishing at least one wireless connection 112. For example, mobile device 110 may be a cellular phone, a personal digital assistant, a hand held computer, a laptop, or the like that is capable of establishing at least one wireless connection 112 with network 160, typically via a base station 162. Mobile device 110 is typically capable of utilizing more than one wired or wireless communication protocol, including utilizing more than one protocol simultaneously. For example, mobile device 110 may be a cellular phone that can communicate voice and data over a wireless network, such as by communicating with base station 162 using code division multiple access (CDMA), time division multiple access (TDMA), global system for mobile communications (GSM), or the like. Additionally, mobile device 110 may also communicate with various devices over a local connection 114 (wired or wirelessly), such as router 120, using such protocols as Universal Serial Bus (USB), Bluetooth®, WiFi® (i.e. IEEE 802.11), ZigBee®, Z-Wave®, OpenWave, or any other wired or wireless communication protocol.

Mobile device 110 is typically capable of communicating voice and/or data with any other telecommunications device by accessing network 160. For example, each wireless connection 112 may include one or more channels, including a voice channel and a data channel. Typically, mobile device 110 communicates with network 160 using a long-range cellular wireless technology, and communicates with devices such as router 120 using short to medium-ranged wireless technologies, like Bluetooth® or WiFi®. Thus, mobile device 110 is capable of simultaneous communication with multiple devices over different operating frequencies and using different wireless protocols. In addition, as illustrated in FIG. 1, mobile device 110 may be connected to router 120 via a wired local connection 114, for example, using USB.

Router 120 is typically one or more devices that utilizes mobile devices 110 to provide various network services to other devices, such as content processing device 130, LAN 140, a computer 142, and a telephone 150. Such network services may include VOIP, interactive and non-interactive media channels, video on-demand (VOD), Internet access, video conferencing, and any other service that can be provided between a local device and a network 160.

Telecommunications network 160 typically includes both wired and wireless communication networks, and enables telecommunications devices to communicate voice and data with one another. For example, network 160 typically facilitates voice and/or data communications between multiple mobile devices 110, content processing devices 130, telephones 150, computers, etc. Network 160 may connect to and/or include a Public Switched Telephone Network (PSTN), a wireless network, satellite communications, or any other network/equipment used to facilitate voice and/or data communications, allowing mobile device 110 to establish connections 112 and provide various network services from service provider 170 to various devices, such as content processing device 130 or telephone 150, for example.

Network 160 may include, but is not limited to, one or more Voice over Internet Protocol (VOIP) networks, Public Switched Telephone Networks (PSTNs), overlay VOIP networks (e.g., a VOIP network overlaid on a PSTN), wireless communication networks (e.g., cellular telephone or satellite pager networks), wireline networks, packet-switched networks, circuit-switched networks, or any combination or subset of any applicable network such as those listed above. Network 160 may be configured to carry one or more types of communication signals, including, but not limited to, Internet Protocol signals (i.e., IP-based signals), Time Division Multiplexing (TDM) signals, Session Initiation Protocol (SIP) signals, PSTN signals, wireless signals (e.g., Code Division Multiple Access (CDMA), Time Division Multiple Access (TDMA), and Global System for Mobile communication (GSM) signals), voice signals, or any other communication signals. In addition, network 160 may facilitate network services from one or more service providers 170.

Service provider 170 may be any system, device, and/or facility that provides one or more network services to a device via network 160. For example, service provider 170 may provide network services to various local devices, such as content processing device 130, computing device 142, telephone 150, or any other device capable of communicating over network 160. Although one service provider 170 is illustrated in FIG. 1, system 100 may include multiple systems and devices, and provide a plurality of network services. For example, service provider 170 may include a provider of various wireless services, and provide voice and data services to mobile devices 110 according to a subscriber or account profile. For example, service provider 170 may include one or more databases for storing account profiles 180.

Account profiles 180 include account information and may be associated with a mobile device 110, a router 120, a customer, a user, a content processing device 130, or some other user or device. Accordingly, profiles 180 may be associated in a database with at least one of a user identifier, a content processing device identifier, a customer premises identifier, and/or a mobile device identifier. Further, profiles 180 may include, for example, information identifying one or more subscription-based services, voice services, data services (e.g., a data plan or subscription), media channels, and/or any number of additional features. For example, account profile 180 may include an indication of whether a mobile device 110 subscribes to various network services, including an unlimited data plan. In one example, router 120 communicates with service provider 170 via mobile devices 110, including accessing data from profiles 180.

To provide such network services from service provider 170, router 120 may be configured to establish a local connection 114 with a mobile device 110, and may then manage a wireless connection 112 between mobile device 110 and network 160. In addition, router 120 may receive requests for network services from local devices, such as a request for VOIP services from telephone 150, and then provide the requested network services using one or more wireless connections 112.

Router 120 may be configured to provide various network services to various devices, such as content processing device 130, computer 142 via a LAN 140, and one or more telephones 150, using connections 112 provided by mobile devices 110. Of course, router 120 may also include one or more wireless cards and/or interfaces for establishing a wireless connection 112 without the use of a mobile device 110.

Router 120 typically includes a processor, a memory, and a computer readable medium for storing computer readable instructions. Router 120 may include any number and variety of different input and output devices and/or interfaces to provide various network services to such devices. For example, router 120 may be configured to communicate with another device, such as a home computer or a mobile device, using one or more mechanisms such as Ethernet, Bluetooth®, WiFi®, or any other wired or wireless communications mechanism. Router 120 may be integrated into another device, such as content processing device 130, or may be provided as a separate device that connects to other devices, as illustrated in FIG. 1. Further, router 120 may include a digital video recorder (DVR), a personal video recorder (PVR), applications to provide and/or facilitate various network services, memory for buffer management, or some other hardware and/or software to provide and/or enhance one or more network services. In addition, router 120 may be capable of communicating with network 160 over auxiliary connection 116. Auxiliary connection 116 may be a cable modem connection, a Digital Subscriber Line (DSL), a telephone line, or some other type of connection.

Some network services may require more bandwidth than what is provided by one wireless connection 112. Further, router 120 may be connected to network 160 via a DSL connection 116, which may not offer enough bandwidth to provide certain network services. In addition, providing multiple network services simultaneously may require more bandwidth than can be provided by one wireless connection 112. In such situations, router 120 may utilize multiple mobile devices 110, and thereby utilize multiple wireless connections 112, to provide such services. Further, router 120 may utilize multiple wireless connections 112 to provide redundancy, such as by ensuring a failover connection for certain network services, such as voice calls using VOIP.

In addition, router 120 may aggregate or stack multiple wireless connections 112 together to provide one or more logical higher-bandwidth data connections to provide such network services. For example, router 120 may utilize multiple channels of a single wireless connection 112, such as by aggregating multiple channels within one connection. In addition, router 120 may aggregate a plurality of wireless connections 120 to provide one or more higher-bandwidth virtual connections. In one example, local connection 114 is a data link layer connection, for example, by treating each mobile device 110 as a modem. Accordingly, router 120 may use certain connection aggregation mechanisms, as discussed below. Further, router 120 may aggregate auxiliary connection 116 and one or more wireless connections 120 to create an aggregated connection to provide various network services.

Router 120 may provide such network services using a number of various bandwidth allocation mechanisms, including using such different mechanisms simultaneously. For example, router 120 may use various bandwidth allocation and management techniques/protocols to provide such network services, including using such technologies that utilize a plurality of wireless connections 112 to provide one or more virtual connections with greater total bandwidth than one of the constituent data connections 112. Examples of such techniques and protocols include, but are in no way limited to, inverse multiplexing, bonding protocols, multilink such as the Point-to-Point (PPP) Multilink Protocol (MP), channel aggregation, channel bonding, load balancing, bridging, virtual concatenation, teaming, port channeling, port teaming, port trunking, link bundling, as well as various data compression techniques. Since router 120 may utilize any number of various bandwidth aggregation mechanisms, wireless connections 112 can be heterogeneous, meaning that mobile devices 110 can establish connections 112 over different networks, using different cellular towers, and using different protocols. In an example where router 120 treats each mobile device 110 as a modem, router 120 can aggregate connections 112 using certain connection aggregation mechanisms, such as the Point-to-Point (PPP) Multilink Protocol (MP), for example.

Certain connection aggregation mechanisms can be implemented by router 120 acting alone. Other mechanisms, such as certain connection aggregation mechanisms like multilink, may require cooperation between router 120 and one or more networking devices within network 160, such as one or more devices associated with base station 162. Router 120 may determine which types of connection aggregation mechanisms can be used and with which connections 112. Thus, router 120 can aggregate connections 112, for example, in response to a request for a high-bandwidth network service.

In addition, router 120 may assess the available bandwidth of each connection 112, and if available, auxiliary connection 116. Thus, router 120 may utilize an appropriate bandwidth aggregation technique, if required, to satisfy a request for a network service from another device, such as content processing device 130 or telephone 150. For example, router 120 may maintain a table or database of bandwidth requirements for various network services, and dynamically allocate the proper amount of bandwidth using connections 112 to provide the requested service. For example, content processing device 130 may request a media channel to provide to television 132. Content processing device 130 may send a request for the media channel to router 120. Router 120 may determine the required amount of bandwidth to provide the media channel, assess the amount of bandwidth available using connections 112, allocate bandwidth accordingly, such as by using a connection aggregation mechanism, and provide the media channel to content processing device 130. Further, a request for a network service may include a request for a specific amount of bandwidth. In addition to connections 112, router 120 may also utilize auxiliary connection 116, such as a DSL or telephone line connection to network 160.

Router 120 may be configured to dynamically manage connections 112 based on a variety of factors. For example, router 120 may dynamically allocate bandwidth based on a request for a network service, based on various reservations of bandwidth, based on the status of a mobile device, and/or based on a profile of a subscriber, such as data stored in an account profile 180. In one example, router 120 establishes local connection 114 between router 120 and mobile device 110 when a mobile device 110 is either within range or is plugged into router 120.

Router 120 may establish local connection 114 with each mobile device 110, and then instruct one or more of the connected mobile devices 110 to establish a wireless connection 112 to network 160 when necessary to provide a network service to a local device. In another example, router 120 instructs each mobile device 110 to establish a wireless connection 112 so that there is minimum delay in providing requested network services. In yet another example, router 120 may retrieve certain information from and/or about each mobile device 110 to determine whether or not to instruct a mobile device 110 to establish a wireless connection 112.

For example, router 120 may determine whether each mobile device 110 subscribes to an unlimited data plan based on data stored in an account profile 180 that is typically maintained by a service provider 170. Further, router 120 may determine the battery status of each mobile device, e.g., whether the device is charging or has a low battery. A mobile device 110 that subscribes to an unlimited data plan and is also currently charging may be instructed to establish a wireless connection 112 regardless of whether there is a request for any network service. Another mobile device 110, on the other hand, that does not subscribe to an unlimited data plan or that is not currently charging, may be instructed to establish a connection only after a need arises for additional bandwidth. Thus, router 120 dynamically manages wireless connections 112 based on any number of different factors, including whether certain connections 112 can be aggregated and with which aggregation mechanism.

In general, computing devices, such as router 120, may employ any of a number of well known computer operating systems, including, but by no means limited to, known versions and/or varieties of the Microsoft Windows® operating system, the Unix operating system (e.g., the Solaris® operating system distributed by Sun Microsystems of Menlo Park, Calif.), the AIX UNIX operating system distributed by International Business Machines of Armonk, N.Y., and the Linux operating system. Computing devices may include any one of a number of well known computing devices, including, without limitation, a computer workstation, a desktop, notebook, laptop, or handheld computer, or some other known computing device.

Computing devices generally each include instructions executable by one or more computing devices such as those listed above. Computer-executable instructions may be compiled or interpreted from computer programs created using a variety of well known programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium (also referred to as a processor-readable medium) includes any tangible medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners, as is known. A file system may be accessible from a computer operating system, and may include files stored in various formats. An RDBMS generally employs the known Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.).

Figure 2:
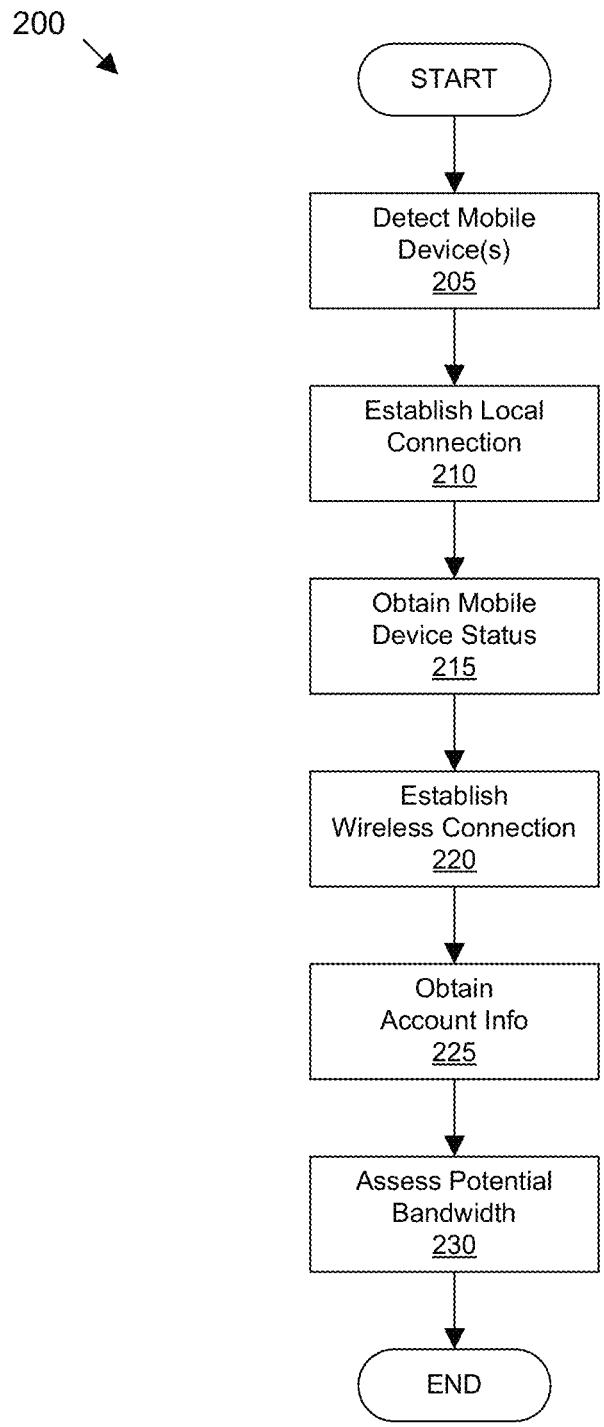
FIG. 2 illustrates an exemplary process for establishing various connections to provide network services.

FIG. 2 illustrates an exemplary process 200 for establishing various connections between router 120, mobile devices 110, and network 160. While exemplary communication technologies are described herein in reference to certain illustrative approaches, other applicable approaches may use other suitable communication technologies for communications between the elements shown in FIG. 1. Of course, any suitable communications technology may be used to establish and carry communications between devices of system 100.

Process 200 begins in block 205 when router 120 detects a mobile device 110. In one example, router 120 detects mobile device 110 when a cable is connected between router 120 and mobile device 110. In another example, mobile device 110 wirelessly broadcasts its availability, allowing router 120 to detect the presence of mobile device 110. Router 120 may periodically send out various broadcasts wirelessly, and a mobile device 110 within range may respond with an indication that it can connect to router 120.

Next, in block 210, router 120 and mobile device 110 establish a local connection 114. Router 120 and mobile device 110 may communicate by wire or wirelessly, such as over WiFi, USB, RS-232, a serial link, or some other communication protocol. In one example, router 120 and mobile device 110 establish a local connection 114 using a data link protocol such that router 120 views mobile device 110 as a modem. Of course, router 120 may include multiple wired and wireless communication interfaces for communicating with mobile devices 110 using various protocols simultaneously.

Next, in block 215, router 120 obtains the status of mobile device 110. For example, router 120 queries mobile device 110 to determine if mobile device 110 is capable of establishing a wireless connection 112, such as by providing a wireless data connection. In addition, router 120 may query to determine if mobile device 110 is currently charging, has a low battery, is currently on a voice call, or being otherwise utilized to communicate data. Further, router 120 may query whether a user has requested that mobile device 110 be utilized to provide various network services. In addition, router 120 may determine whether a user of a mobile device 110 reserves bandwidth for using mobile device itself for various network services, such as by making voice calls or data services, such as email.

Next, in block 220, mobile device 110 establishes a wireless connection 112 with network 160. Router 120 may instruct one of a plurality of mobile devices 110 to establish a wireless connection 112 with network 160.

Next, in block 225, router 120 obtains account info regarding mobile device 110. For example, router 120 may utilize wireless connection 112 to query a service provider 170 for various data regarding mobile device 110. For example, router 120 may query an account profile 180 to determine whether a mobile device has a data plan, is authorized for aggregate data services, or some other data regarding mobile device 110. Router 120 may query data in account profile 180 to determine which network services a user of mobile device 110 is authorized to access. For example, router 120 may utilize data in account profile 180 to determine which media channels a user can access, whether a user is authorized for VOIP services, a phone number associated with a user (e.g., an alternative phone number used for telephone 150 as opposed to mobile device 110), and billing information.

Next, in block 230, router 120 assesses the potential bandwidth of each wireless connection 112. In addition, router 120 may determine which wireless connections 112 are capable of being aggregated, as opposed to being used in parallel, and the total potential bandwidth available. For example, assessing the potential bandwidth may include accounting for users of mobile devices 110 that desire to reserve bandwidth to continue using various services on their mobile device 110, such as various voice or data services. Following block 230, process 200 ends, and router 120 is configured to provide network services to various devices using mobile devices 110.

Figure 3:
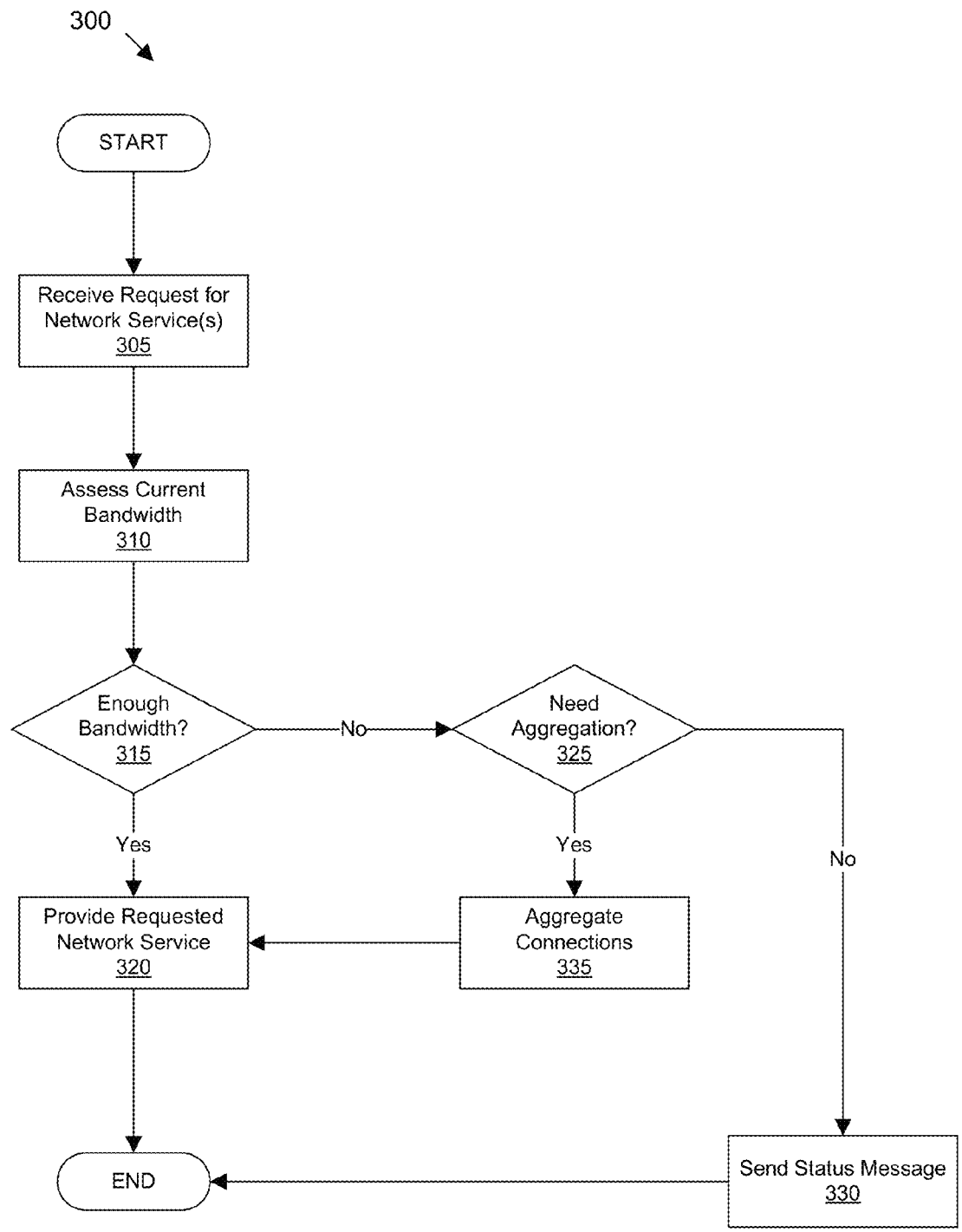
FIG. 3 illustrates an exemplary process for providing various network services using mobile devices.

FIG. 3 illustrates an exemplary process 300 for providing network services using mobile devices 110. Process 300 begins in block 305 when router 120 receives a request for one or more network services. Generally, such network services are provided via network 160 using mobile devices 110. Router 120 may also utilize auxiliary connection 116 as well, for example, by aggregating one or more connections 112 with auxiliary connection 116. Router 120 may be connected to a variety of devices, including connected to various computing devices via one or more networks, including LAN 140. As illustrated in FIG. 1, for example, router 120 may receive requests for network services from content processing device 130, computing device 142, and/or telephone 150. For example, content processing device 130 may request one or more media channels, video on demand programs, interactive media applications, an interactive program guide, or some other network service. Telephone 150 may request to establish a telephone call, and computing device 142 may request to access web content (e.g., web pages, file downloads, etc.), Internet access, or some other network-based application. In addition, router 120 may be connected to a video conferencing system and receive a request to establish a video conference via network 160.

Next, in block 310, router 120 assesses an amount of bandwidth currently available to provide the requested network service to the requesting local device. For example, router 120 may be currently connected to a plurality if mobile devices 110, each of which is capable of providing a certain amount of bandwidth to provide the network service. In addition, router 120 may be currently capable of utilizing a plurality of wireless connections 112, including one or more aggregated connections. Router 120 may determine which mobile devices 110 have established wireless connections 112, and which are available to establish a wireless connection 112. Further, router 120 may determine the amount of bandwidth currently being utilized by other local devices and other network services, and deduct that from the total amount of potential bandwidth available using mobile devices 110. In addition, router 120 may be connected to network 160 via auxiliary connection 116, and may add the amount of available bandwidth via connection 160 to a total of potential available bandwidth that router 120 may utilize to provide network services to a requesting device.

Next, in decision diamond 315, router 120 determines if there is sufficient bandwidth to provide the requested network service. In one example, the request for a network service received in block 305 includes an indication of a desired amount of bandwidth. For example, a request for a media channel may include an indication of the expected amount of bandwidth required to provide the media channel. In another example, router 120 includes a table and/or database with estimates of the required amount of bandwidth, possibly estimating a minimum amount of required bandwidth, for a variety of potential network services.

Router 120 may then determine how many connections 112 are currently active and connected and how much bandwidth they can currently provide. Router 120 may then determine whether that amount of bandwidth is sufficient to provide the requested network service. Router 120 may determine whether there are additional mobile devices 110 that can provide additional bandwidth. In one example, router 120 establishes local connections 114 with a plurality of mobile devices 110, and can then query those devices 110 to determine if they are available to establish a connection 112 to provide additional bandwidth. If additional devices are available, then router 120 may instruct each mobile device 110 to establish a wireless connection 112. For example, a mobile device 110 may be able to dedicate multiple channels to providing bandwidth to router 120, and router 120 may instruct mobile device 110 to establish another connection 112 using another channel. Router 120 may also send out a broadcast signal to determine if there are additional mobile devices 110 within range. If router 120 determines that there is sufficient bandwidth, then process 300 proceeds to block 320. If router 120 determines that there is insufficient bandwidth, then process 300 proceeds to decision diamond 325.

In block 320, router 120 provides the requested network service to the requesting device. As previously discussed, router 120 provides the requested service via one or more mobile devices 110 over connections 112 with network 160. In one example, router 120 may instruct various devices 110 to establish additional connections to provide the requested service. The requested network service may be provided by a service provider 170 via network 160, as previously discussed.

In decision diamond 325, router 120 determines if connections 112 need to be aggregated to provide a sufficient amount of bandwidth for the requested network service. Router 120 may be capable of utilizing a number of different aggregation mechanisms, as discussed above. Router 120 may then select an appropriate aggregation mechanism to provide enough bandwidth in order to provide the requested network service. As previously discussed, router 120 may cooperate with other network devices, such as devices included in network 160, such as base station 162, to aggregate various connections 112. Further, router 120 may select an aggregation mechanism based on the types of connections 112, whether connections 112 terminate at the same wireless base station 162, the type(s) of connections 112, which aggregation mechanisms service provider 170 supports, or any other factor for determining which aggregation mechanisms can be used. If router 120 determines that connections 112 cannot be aggregated, or that even if aggregated connections 112 cannot provide sufficient bandwidth, then process 300 proceeds to block 330. If router 120 determines that connections 112 need to be aggregated to provide sufficient bandwidth to provide the requested network service, process 300 proceeds to block 335.

In block 330, router 120 provides a status message to the requesting device. For example, the status message may inform the requesting device that there is insufficient bandwidth to provide the requested network service. Further, the status message may provide instructions for providing additional bandwidth, including an indication of how many devices 110 are available and which devices 110 are currently reserving bandwidth.

In block 335, router 120 aggregates connections 112. As previously discussed, router 120 may utilize any number of different types of aggregation mechanisms. In addition, router 120 may also aggregate auxiliary connection 116 with connections 112 to establish an aggregated connection. Following block 345, process 300 proceeds to block 320 and provides the requested network service. Following block 320, process 300 ends.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent upon reading the above description. The scope of the invention should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the invention is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A system, comprising:
   a plurality of mobile devices, each of the plurality of mobile devices being configured to establish a wireless connection with a network; and
   a router in selective communication with a local device and the plurality of mobile devices, the router being configured to:
      establish a local connection with each of the plurality of mobile devices,
      cause at least one of the plurality of mobile devices to establish a connection with the network,
      receive a request for a network service from the local device,
      determine whether one or more of the plurality of mobile devices have reserved a portion of its own respective bandwidth for its own respective future use,
      provide the requested network service to the local device via a plurality of wireless connections between the at least one of the plurality of mobile devices that have established a connection with the network and the network;
      instruct at least one additional mobile device of the plurality of mobile devices to establish a wireless connection with the network if it is determined that there is insufficient available bandwidth among the wireless connections already established between the at least one of the plurality of mobile devices and the network to provide the requested network service to the local device;
      aggregate at least two of the wireless connections between ones of the plurality of mobile devices and the network to create an aggregated connection; and
      provide the requested network service to the local device via the aggregated connection.

2. The system of claim 1, the router being further configured to interface with a plurality of local devices, including at least a subset of a telephone, a computing device, and a content processing device.

3. The system of claim 1, the router being further configured to:
   detect a mobile device capable of establishing a wireless connection with the network,
   establish a local connection with the mobile device in response to detecting the mobile device,
   obtain a status of the mobile device,
   obtain account information regarding the mobile device, and
   assess an amount of potential bandwidth available via the mobile device.

4. The system of claim 1, the router being further configured to:
   determine which connection aggregation mechanisms can be implemented to aggregate the plurality of wireless connections into the aggregate connection,
   select at least one connection aggregation mechanism, and
   aggregate at least two wireless connections using the selected aggregation mechanism.

5. The system of claim 4, wherein the connection aggregation mechanisms include at least one of the following: inverse multiplexing, a bonding protocol, a multilink protocol, a Point-to-Point (PPP) Multilink Protocol (MP), channel aggregation, channel bonding, load balancing, bridging, virtual concatenation, teaming, port channeling, port teaming, port trunking, link bundling, and data compression.

6. The system of claim 1, wherein the local connection with each of the plurality of mobile devices is a data link layer connection and the router is further configured to treat each mobile device as a modem.

7. The system of claim 1, the router being further configured to:
   determine, based on the amount of bandwidth required to provide the requested network service to the local device, if any wireless connections need to be aggregated, and
   select at least one aggregation mechanism to provide the requested network service.

8. The system of claim 1, wherein the router is configured to:
   obtain status information of each of the plurality of mobile devices, the status information including the following: a wireless connection capability, a battery status, and whether bandwidth should be reserved for the mobile device;
   determine if there is sufficient available bandwidth among those of the plurality of mobile devices that have established a connection with the network to provide the requested network service to the local device;
   cause at least one additional mobile device of the plurality of mobile devices to establish a wireless connection to the network if it is determined that there is insufficient available bandwidth, and
   select which of the plurality of mobile devices shall be caused to establish a wireless connection with the network based on the received status information.

9. The system of claim 8, wherein the router is configured to, in selecting which of the plurality of mobile devices shall be caused to establish a wireless connection with the network based on the received status information, to prefer those of the plurality of mobile devices that do not have a low battery level.

10. The system of claim 8, wherein the router is configured to, in selecting which of the plurality of mobile devices shall be caused to establish a wireless connection with the network based on the received status information, to prefer those of the plurality of mobile devices that are charging.

11. A method, comprising:
    establishing a local connection with each of a plurality of mobile devices;
    causing at least one of the plurality of mobile devices to establish a connection with a network;
    receiving a request for a network service from a local device;
    determining if there is sufficient available bandwidth among wireless connections established between ones of the plurality of mobile devices and the network to provide the requested network service to the local device based at least in part on whether one or more of the plurality of mobile devices have reserved a portion of its own respective bandwidth for its own respective future use;
    providing the requested network service to the local device via the wireless connections established between the at least one of the plurality of mobile devices and the network if there is sufficient available bandwidth;
    instructing at least one additional mobile device of the plurality of mobile devices to establish a wireless connection with the network if it is determined that there is insufficient available bandwidth among the wireless connections already established between the at least one of the plurality of mobile devices and the network to provide the requested network service to the local device;
    aggregating at least two of the wireless connections between ones of the plurality of mobile devices and the network to create an aggregated connection; and
    providing the requested network service to the local device via the aggregated connection.

12. The method of claim 11, further comprising interfacing with a plurality of local devices, including at least a subset of a telephone, a computing device, and a content processing device.

13. The method of claim 11, comprising:
    detecting a mobile device;
    establishing a local connection with the mobile device in response to detecting the mobile device;
    obtaining a status of the mobile device;
    obtaining account information regarding the mobile device; and
    assessing the amount of potential bandwidth available via the mobile device.

14. The method of claim 11, further comprising:
    determining which connection aggregation mechanisms can be implemented; and
    selecting at least one connection aggregation mechanism to provide the requested network service.

15. The method of claim 11, wherein the local connection with each of the plurality of mobile devices is a data link layer connection and each mobile device is treated as a modem.

16. The method of claim 11, further comprising:
    determining, based on the amount of bandwidth required to provide the requested network service, if any wireless connections between ones of the plurality of mobile devices and the network need to be aggregated; and
    selecting at least one aggregation mechanism to provide the requested network service.

17. The method of claim 11, further comprising:
    obtaining status information of each of the plurality of mobile devices, the status information including the following: a wireless connection capability, a battery status, whether a voice call is currently in progress, and whether bandwidth should be reserved for the mobile device;

selecting which of the plurality of mobile devices shall be caused to establish a wireless connection with the network based on the received status information; and instructing the selected mobile device to establish the wireless connection with a network.

18. An apparatus, comprising:
a local device interface configured to facilitate communications with a local device;
a mobile device interface configured to facilitate communications with a plurality of mobile devices, each of the plurality of mobile devices being further configured to facilitate communications with a service provider via a wireless connection with a network; and
instructions stored on a computer-readable medium and executable on a processor, including instructions to:
establish a local connection with each of the plurality of mobile devices,
cause at least one of the plurality of mobile devices to establish a connection with the network,
receive a request for a network service from the local device,
determine whether at least one of the plurality of mobile devices has reserved a portion of its own respective bandwidth for its own respective future use,
aggregate at least two wireless connections between the plurality of mobile devices and the network to create an aggregated connection;
provide the requested network service to the local device via the aggregated connection;
instruct at least one additional mobile device of the plurality of mobile devices to establish a wireless connection with the network if it is determined that there is insufficient available bandwidth among the wireless connections already established between the at least one of the plurality of mobile devices and the network to provide the requested network service to the local device;
aggregate at least two of the wireless connections between ones of the plurality of mobile devices and the network to create an aggregated connection; and
provide the requested network service to the local device via the aggregated connection.

19. The apparatus of claim 18, further comprising a plurality of local interfaces to interface with a plurality of local devices, including at least a subset of a telephone, a computing device, and a content processing device.

20. The apparatus of claim 18, further comprising instructions to:
detect a mobile device, establish a local connection with the mobile device in response to detecting the mobile device,
obtain a status of the mobile device,
obtain account information regarding the mobile device, and
assess the amount of potential bandwidth available via the mobile device.

21. The apparatus of claim 18, further comprising instructions to:
determine which connection aggregation mechanisms can be implemented to aggregate the at least two wireless connections into the aggregated connection,
select at least one connection aggregation mechanism, and
aggregate the at least two wireless connections using the selected connection aggregation mechanism.

22. The apparatus of claim 18, further comprising instructions to:
determine, based on the amount of bandwidth required to provide the requested network service to the local device, if any wireless connections between ones of the plurality of mobile devices and the network need to be aggregated, and
select at least one aggregation mechanism to provide the requested network service.

23. A system, comprising:
a plurality of mobile devices, each of the plurality of mobile devices being configured to establish a wireless connection with a network; and
a router in selective communication with a local device and the plurality of mobile devices, the router being configured to:
establish a local connection with each of the plurality of mobile devices,
cause at least one of the plurality of mobile devices to establish a connection with the network,
receive a request for a network service from the local device,
determine whether one or more of the plurality of mobile devices have reserved a portion of its own respective bandwidth for its own respective future use,
provide the requested network service to the local device via a plurality of wireless connections between the at least one of the plurality of mobile devices that have established a connection with the network and the network;
obtain status information of each of the plurality of mobile devices, the status information including the following: a wireless connection capability, a battery status, and whether bandwidth should be reserved for the mobile device;
determine if there is sufficient available bandwidth among those of the plurality of mobile devices that have established a connection with the network to provide the requested network service to the local device;
cause at least one additional mobile device of the plurality of mobile devices to establish a wireless connection to the network if it is determined that there is insufficient available bandwidth, and
select which of the plurality of mobile devices shall be caused to establish a wireless connection with the network based on the received status information.

* * * * *